(12) United States Patent
Travis et al.

(10) Patent No.: US 8,700,711 B2
(45) Date of Patent: *Apr. 15, 2014

(54) CONTROLLING DELIVERY OF NOTIFICATIONS IN REAL-TIME COMMUNICATIONS BASED ON COMMUNICATION CHANNEL STATE

(75) Inventors: Amy D. Travis, Arlington, MA (US); Josef Scherpa, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,868

(22) Filed: Sep. 14, 2012

(65) Prior Publication Data

US 2013/0007175 A1    Jan. 3, 2013

Related U.S. Application Data

(63) Continuation of application No. 12/620,789, filed on Nov. 18, 2009.

(51) Int. Cl.
*G06F 15/16* (2006.01)
*G06F 15/173* (2006.01)

(52) U.S. Cl.
USPC .......... 709/204; 709/205; 709/206; 709/207; 709/238; 709/239

(58) Field of Classification Search
USPC ................. 709/204–207, 238, 239
See application file for complete search history.

(56) References Cited

U.S. PATENT DOCUMENTS

| 5,974,446 | A | * | 10/1999 | Sonnenreich et al. | 709/204 |
| 6,020,885 | A | * | 2/2000 | Honda | 715/757 |
| 7,257,617 | B2 | * | 8/2007 | Brown et al. | 709/204 |
| 7,363,345 | B2 | | 4/2008 | Austin-Lane et al. | |
| 7,503,006 | B2 | * | 3/2009 | Danieli | 715/751 |
| 8,072,909 | B2 | * | 12/2011 | Gierach et al. | 370/261 |
| 8,250,141 | B2 | * | 8/2012 | Xiao et al. | 709/204 |
| 2002/0087634 | A1 | * | 7/2002 | Ogle et al. | 709/204 |
| 2002/0087649 | A1 | * | 7/2002 | Horvitz | 709/207 |
| 2003/0023683 | A1 | * | 1/2003 | Brown et al. | 709/204 |
| 2004/0246121 | A1 | * | 12/2004 | Beyda | 340/506 |
| 2005/0091683 | A1 | | 4/2005 | Sheynman et al. | |
| 2007/0100939 | A1 | * | 5/2007 | Bagley et al. | 709/204 |
| 2010/0005142 | A1 | * | 1/2010 | Xiao et al. | 709/204 |

* cited by examiner

Primary Examiner — David Lazaro
Assistant Examiner — Edward Kim
(74) Attorney, Agent, or Firm — David A. Dagg (57) ABSTRACT

A critical notification is reliably delivered to at least one participant in a real-time communication session. A candidate delivery channel is selected, and a set of one or more communication state variables associated with the candidate delivery channel are identified. Current values associated with the communication state variables and determined, and a determination is made as to whether the current values associated with the communication state variables indicate that the notification can currently be reliably delivered using the candidate delivery channel. If the notification cannot currently be reliably delivered using the candidate delivery channel, an alternative delivery option is selected that may include using an alternative delivery channel and/or delaying delivery of the notification.

14 Claims, 6 Drawing Sheets

Fig. 6

CONTROLLING DELIVERY OF NOTIFICATIONS IN REAL-TIME COMMUNICATIONS BASED ON COMMUNICATION CHANNEL STATE

CROSS REFERENCE TO RELATED APPLICATIONS

The present application is a Continuation application under 35 U.S.C. 120 of commonly owned prior application Ser. No. 12/620,789, filed on Nov. 18, 2009, in the names of Amy D. Travis et al, currently pending, all disclosures of which are hereby included by reference.

FIELD OF THE INVENTION

The present invention relates generally to real-time communication and/or collaboration systems, and more specifically to a method and system for controlling delivery of notifications in real-time communications based on delivery channel state.

BACKGROUND OF THE INVENTION

It is often desirable to deliver a notification to a computer system user that is currently involved in a real-time communication session. However, in existing systems, it may be difficult to determine whether the remote user will be able to receive the notification at the time it is generated. This problem arises in part due to the fact that existing systems may not operate to effectively determine whether the communication channel to the remote user has a current state that would make it unlikely that the notification would be effectively delivered. As a result, a time critical notification, and/or a notification relating to the current real-time communication session, may be sent even though the current state of the communication channel over which the notification is transferred makes it unlikely that the notification will be effectively received.

Various specific aspects of the state of a user's client system may prevent a notification from being received. For example, in the case of an audible notification, such as a sound or portion of speech, delivery may be prevented because the audio output for the recipient user's client device or system is currently in a "muted" state. The muted state may be the result of the user having set the audio output level on their client device to an inaudible level (e.g. "0"), for example by manipulating a graphical control in their system's user interface (e.g. lowering a virtual slider, clicking on or otherwise selecting a "mute" checkbox or the like, etc.), by manipulating a mechanical button or switch on their device (e.g. a "mute" button or the like), or using some other specific technique. If a critical audible notification is generated for a user when the audio output of their client device is muted, the notification may be "played" by the user's client device, but no sound is actually generated, and the notification is accordingly not delivered.

In the case of a visual notification, such as a change made within the user's graphical user interface, delivery may be prevented because the application window containing the visual notification is not currently visible. The application window of the visual notification may not currently be visible because it is obscured by another application window. If a critical visual notification is generated for a user when another graphical object is located over the location of notification within the user interface, the visual notification is not visible, and the notification is accordingly not delivered.

The delivery of various specific types of critical audible or visible notifications may be prevented by the current state of the communication channel. An example of an important audio notification in this regard is a recording notification informing a user that a phone call they are participating in is currently being recorded. Such notifications may be legally required in various jurisdictions (e.g. countries, individual states in the United States, etc.) having laws requiring that participants in telephone calls be alerted to the fact that a recording of the call is being made. The specific alert requirements vary across jurisdictions, and may include requiring a verbal notification that the communication is being recorded, playing of a periodic beep tone, and/or other requirements. Examples of important visual notifications in this regard include notifications relating to the real-time communication session itself, such as visual notifications indicating that a participant wishes to make a comment or ask a question in the session.

It would accordingly be desirable to have a new automated solution that can more reliably provide critical notifications to participants in a real-time communication session.

SUMMARY OF THE INVENTION

To address the above described and other shortcomings of previous systems, a solution is disclosed that more reliably delivers notifications to participants in a real-time communication session. The disclosed system determines the state of the communication channel to be used to deliver the notification. If the disclosed system determines that the current state of the communication channel would prevent reliable delivery of the notification, then an alternative delivery option is selected such as using an alternative delivery channel and/or delaying delivery of the notification. If the current state of the communication channel would not prevent reliable delivery of the notification, then the notification is delivered using that communication channel.

The disclosed system may operate to reliably deliver audible and/or visible notifications. For example, in the case of an audible notification, the disclosed system may operate to check the state of an audio communication channel to be used to deliver the notification. Such checking of the audio communication channel may include checking whether the audio output on the client system of the destination user for the notification is currently muted. If so, the disclosed system may select an alternative notification delivery channel, such as a visual communication channel that may be available to deliver a visual version (e.g. text) of the audible notification to the destination user. The disclosed system may further determine the current state of the alternative communication channel, in order to find out whether it can currently be used to reliably deliver the notification to the destination user. If the state of the alternative communication channel indicates that it can reliably be used, then the notification may be conveyed to the destination user through it.

The alternative delivery option may further include or be made up of delaying delivery of the notification until the current state of a selected communication channel indicates that it can reliably be used to deliver the notification.

In the case of a visible notification, checking the state of a visual communication channel may, for example, include determining a current display state of the destination user's client system. Such a display state may include an indication of whether a graphical user interface window within which the notification would be displayed is currently obscured by any other windows in the user interface.

Various specific types of notifications may be delivered through the disclosed system. For example, audible notifications may be delivered such as recording notifications that must be sent to participants in a real-time communication session to notify the participants that the audio and/or visual content of the communication session is currently being recorded. In this regard, embodiments of the disclosed system may provide recording notifications with regard to the recording of the content of various specific types of real-time communication sessions, including communication sessions based on audio communication channels (e.g. VoIP calls), as well as communication sessions providing both shared audio and shared visual data (e.g. shared video and/or graphical information), such as Web conferences and the like.

Visual notifications that may reliably be delivered using the disclosed system include notifications relating to participants in a current real-time communication session. Such notifications may indicate that a specific session participant has indicated that they have a question, or wish to make a comment. For example, such visual notifications may include or consist of visual changes in the display of a graphical object (e.g. an icon or the like) associated with the participant, and contained in a user interface window associated with the session.

In one embodiment, in response to a determination that a communication session is being recorded, and in response to a determination that a recording notification is required for one or more participants in the session, a candidate delivery channel for the notification is selected. For example, a default or initial candidate delivery channel may be the same as the primary communication channel for the communication session (e.g. the VoIP session itself for a VoIP call, or one of the voice channel or video channel for a Web conference). The system determines a set of one or more relevant communication state variables for the candidate delivery channel, such as communication device and/or participant state variables. For example, the relevant communication device state variables for a candidate VoIP session over which a VoIP call is being made may include client system state variables indicating whether the audio output on a participant's VoIP device (e.g. VoIP phone and/or client computer system) is currently muted, and/or session state variables indicating whether the VoIP call is currently on hold, and/or other specific communication device state variables.

The relevant communication state variables for a candidate delivery channel may additionally include participant state variables, such as the current on-line status of a participant (e.g. the on-line "presence" status of the participant). For example, an on-line status of "away" may result in determination that a participant is not currently able to receive a visually conveyed recording notification or the like. The identities (i.e. variable names or the like) of the relevant communication variables for a given communication channel may, for example, be retrieved from a centrally stored or distributed database associating relevant variables with communication channel types or the like.

The disclosed system reads and checks the current values of the relevant communication state variables for the candidate communication channel. The current values of the relevant communication state variables may, for example, be read at a shared server system, and/or at one or more client computer systems or communication devices associated with individual participants. For example, state variables indicating a current "muted" state of an audio subsystem in a client device, or indicating the current state of a session underlying a VoIP call, may be automatically maintained and accessed either at a shared server system, and/or distributed across participating client systems in a peer-to-peer embodiment. Similarly, the checking of the current values of the relevant communication state variables may also be performed at a shared server system, and/or at one or more client computer systems or communication devices associated with individual participants.

Based on the current values of the relevant communication state variables for the candidate communication channel, the disclosed system determines whether the notification can currently be reliably delivered through the candidate communication channel. If so, the notification is immediately delivered using that communication channel. Otherwise, responsive to a determination that the notification cannot be reliably delivered through the candidate communication channel, the disclosed system selects an alternative delivery strategy. The specific alternative delivery strategy selected may, for example, be responsive to user preference or administrator defined configuration settings.

The alternative delivery strategy may include options such as 1) selecting an alternative communication channel and either immediately using the alternative channel to deliver the notification or determining and checking the values of the relevant communication variables for the alternative channel to see if the notification can be reliably delivered through it, and/or 2) delaying the delivery of the recording notification until the communication state variable values indicate that the notification can be reliably delivered to the participant using the candidate delivery channel. For example, in option 2), the disclosed system may operate to periodically check the values of the relevant communication state variables until their values indicate that the recording notification can be reliably delivered using the candidate delivery channel. In option 1), the disclosed system may operate to select an alternative communication channel based on user preferences or administrator configuration settings. For example, in the case where delivery could not be reliably made to a participant using a candidate communication channel that relied on audio output (e.g. a VoIP session) because the audio output on the client device for the participant is currently muted, a visual communication channel may be selected and used as an alternative delivery channel (e.g. resulting in a visual display of the notification in the participants display device).

Thus there is disclosed an automated solution that more reliably provides a notification such as a recording notification, to a user such as a participant in a real-time communication session.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

While for purposes of explanation the following description makes reference to operation of one or more embodiments providing specific types of notifications, including notifications regarding recordings of real-time communication sessions and/or notifications indicating that a session participant has a question or comment, those skilled in the art will recognize that the disclosed system is not limited to providing any specific type of notification. Accordingly, the disclosed system may be embodied or configured to reliably provide notifications of any appropriate type and having any appropriate content as may be needed for a given use, application or deployment.

Figure 1:
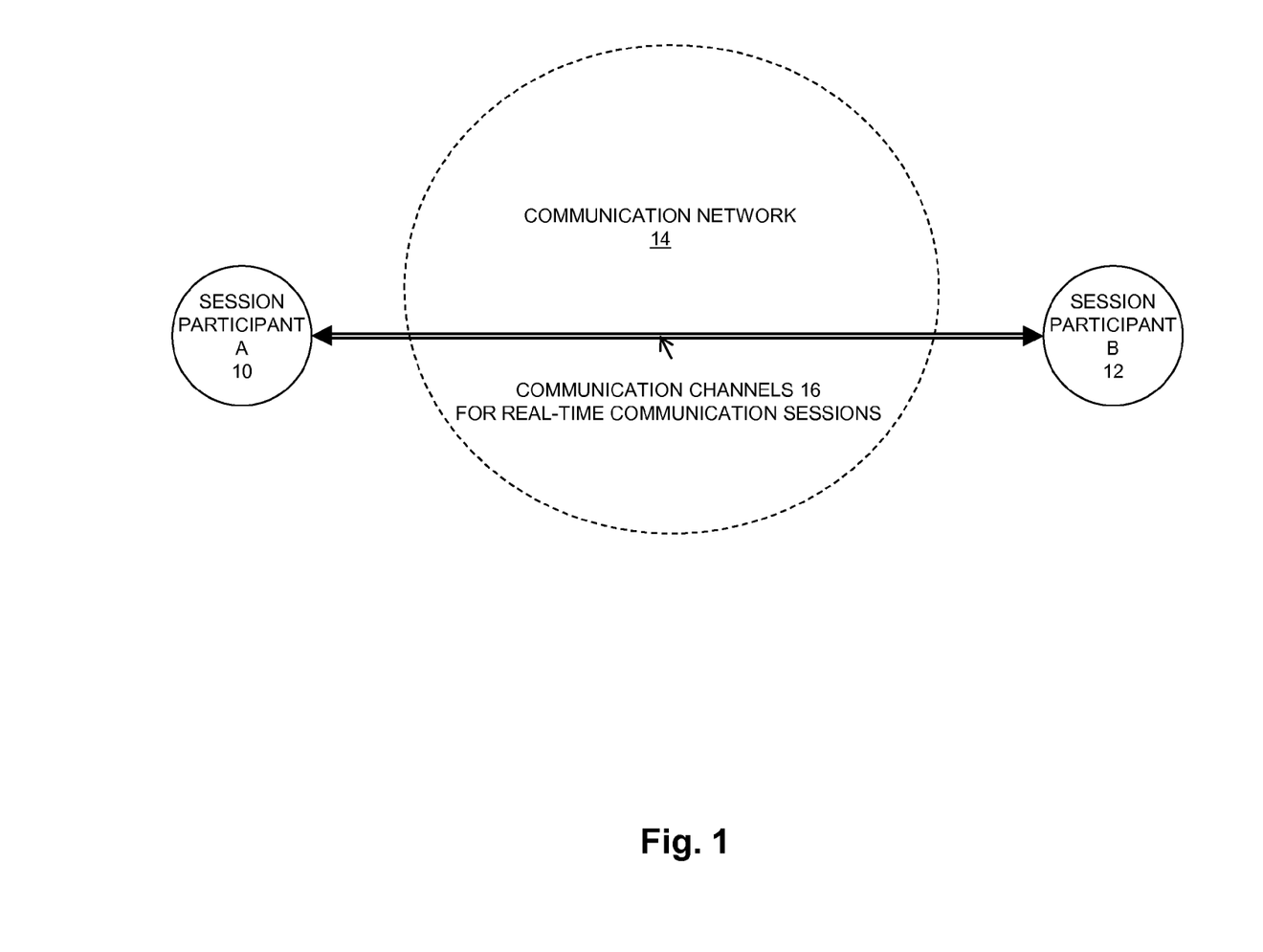
FIG. 1 is a block diagram showing one or more communication channels through which participants in a real-time communication session communicate in an illustrative embodiment of the disclosed system.

FIG. 1 is a block diagram showing one or more communication channels through which participants in a real-time communication session communicate in an illustrative embodiment of the disclosed system. As shown in FIG. 1, Session Participant A 10 communicates with Session Participant B 12 over one or more Communication Channels 16. The Communication Channels 16 support one or more real-time communication sessions between Participant A 10 and Participant B 12, such as, for example, a voice call between Participant A 10 and Participant B 12, such as a VoIP (Voice over IP) or POTS (Plain Old Telephone Service) call, and/or a Web Conference or the like in which Participant A 10 and Participant B 12 are among the participating users simultaneously sharing both audio and video data in real-time.

Participant A 10 and Participant B 12 each use a client device to communicate over the Communication Channels 16, through a Communication Network 14 that may include one or more server systems and/or networking devices. The Communication Channels 16 may include audio channels, providing voice communications between Participant A 10 and Participant B 12, and/or visual communication channels, over which visual and/or graphical information is shared between Participant A 10 and Participant B 12.

During operation of the embodiment shown in FIG. 1, and as further described below, the disclosed system operates to use at least one of the Communication Channels 16 to reliably deliver a notification to Participant A 10 and/or Participant B 12. Examples of the delivered notification may relate to the recording of a real-time communication session between Session Participant A 10 and Session Participant B 12. Such notifications may, for example, include an indication that recording of the real-time communication session has started, an indication that the recording of the real-time communication session has been paused, and/or an indication that the recording of the real-time communication session has stopped.

Other examples of the delivered notification may relate to actions of the participants in the real-time communication session. Such notifications may, for example, include an indication that a specific one of the participants wants to ask a question or has a comment.

Figure 2:
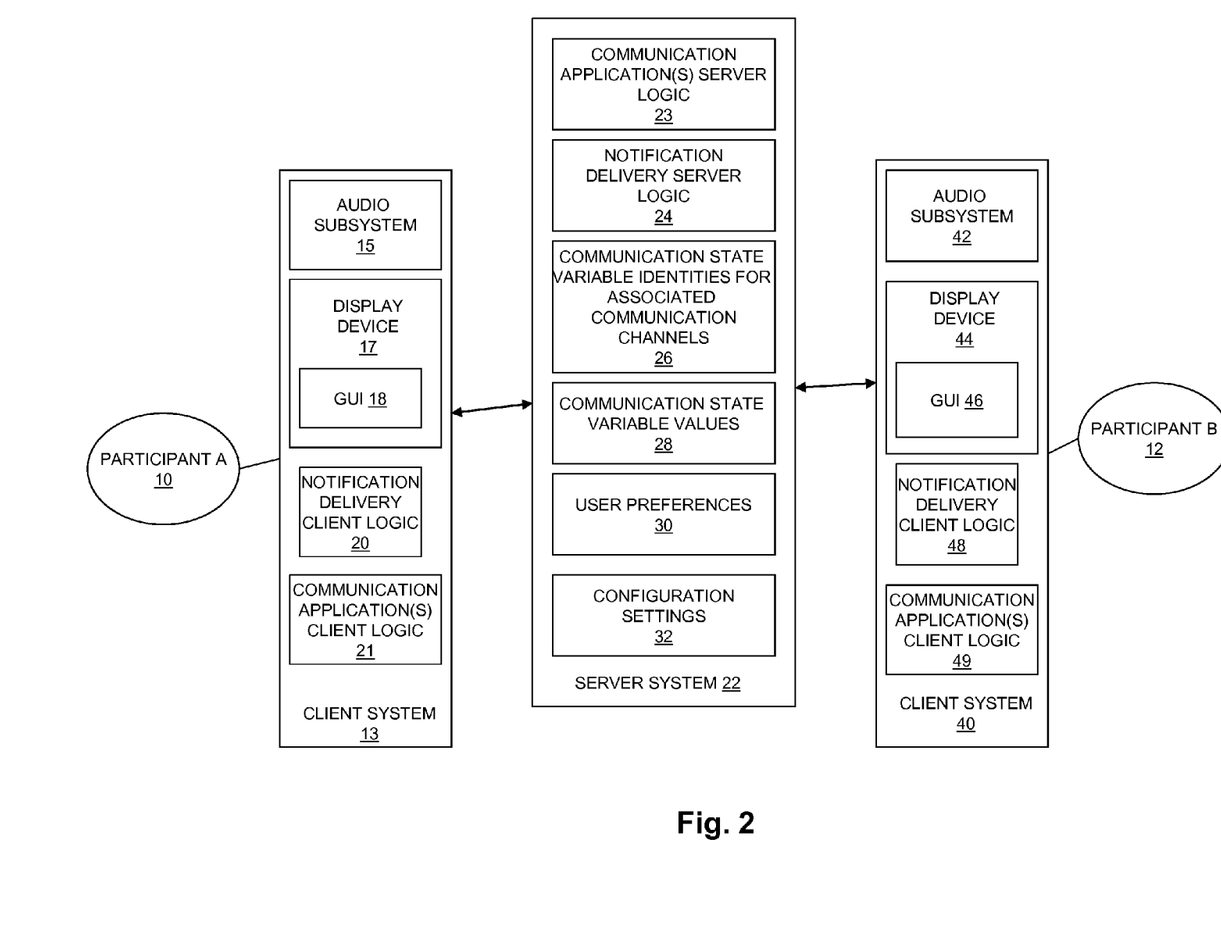
FIG. 2 is a block diagram showing hardware and/or software components in an illustrative embodiment of the disclosed system.

FIG. 2 is a block diagram showing hardware and/or software components in an illustrative embodiment of the disclosed system. As shown in FIG. 2, Participant A 10 is associated with and uses a Client System 13. For purposes of illustration, Client System 13 is shown including an Audio Subsystem 15 (e.g. including a speaker or speakers, or headphones or the like for outputting audio to Participant A 10), a Display Device 17 for displaying a Graphical User Interface (GUI) 18 through which graphics and/or video may be displayed to Participant A 10, Notification Delivery Client Logic 20, and Communication Application(s) Client Logic 21. Client System 13 is communicably connected (e.g. via the Communication Network 14 shown in FIG. 1) to at least one server system, shown in FIG. 2 as Server System 22.

For purposes of illustration, Server System 22 is shown including Communication Application(s) Server Logic 23, Notification Delivery Server Logic 24, Communication State Variable Identities for Associated Communication Channels 26, Communication State Variable Values 28, User Preferences 30, and Configuration Settings 32.

As further shown in FIG. 2, Participant B is associated with and uses a Client System 40. For purposes of illustration, Client System 40 is shown including an Audio Subsystem 42 (e.g. including a speaker or speakers, or headphones or the like for outputting audio to Participant B 12), a Display Device 44 for displaying a Graphical User Interface (GUI) 46 through which graphics and/or video may be displayed to Participant B 12, Notification Delivery Client Logic 48, and Communication Application(s) Client Logic 49. The Client System 40 is also communicably connected (e.g. via the Communication Network 14 shown in FIG. 1) to at least one server system, shown for purposes of illustration in FIG. 2 as Server System 22.

During operation of the embodiment shown in FIG. 2, the disclosed system operates, for example responsive to and/or under the control of Notification Delivery Client Logic 20, Notification Delivery Server Logic 24 and/or Notification Delivery Client Logic 48, to reliably deliver a notification to Participant A 10 and/or Participant B 12, such as a recording notification indicating that audio and/or video data being shared in a real-time communication session in which at least Session Participant A 10 and Session Participant B 12 are participants is currently being recorded. The notification may further indicate that the recording of the session has started, has been paused, and/or has been stopped. Alternatively, the notification may be any other specific type of notification, such as a visual notification to all session participants indicating that one of the session participants current has a question or wishes to make a comment.

For example, in one embodiment, the notification may initially be an audio notification, and the disclosed system determines whether the audio output of a client device of a user to which the audio notification is to be delivered (e.g. Participant A 10 or Participant B 12), is currently muted. The disclosed system operates in response to determining that audio output of a participant's client device is currently muted by selecting a visual channel through which to deliver a text or graphical notification equivalent to the audio notification, and then delivering the text or graphical notification to the session participants, as further described below.

Alternatively, in another embodiment, the notification may initially be a visual notification, and the disclosed system determines whether the display state of a client device of a user to which the visual notification is to be delivered (e.g. Participant A 10 or Participant B 12) indicates that the window to be used to display the visual notification is currently obscured by another window in the graphical user interface. The embodiment of the disclosed system operates in response to determining that the window to be used to display the visual notification is currently obscured by another window in the graphical user interface by selecting a audio channel through which to deliver an audible notification (e.g. sound and/or speech) equivalent to the visual notification, and then delivering the audible notification to the session participants, as further described below.

While for purposes of concise illustration only two session participants and associated client systems are shown in FIGS. 1 and 2, those skilled in the art will recognize that the disclosed system may be embodied such that any specific number of session participants may be reliably notified using the disclosed system. Similarly, while for purposes of concise illustration only one server system is shown in FIG. 2, the disclosed system may be embodied such that any specific number of server systems are used to perform the operations described in association with the Server System 22. In addition, while a client-server type of embodiment is shown in the example of FIG. 2, the disclosed system may alternatively be embodied in a peer-to-peer architecture, in which some or all of the operations described in association with the Server System 22 are instead distributed among one or more of the various client devices.

The Client Systems 13 and 40 of FIG. 1 may include any specific type of a computer system and/or intelligent electronic device, such as a desktop, laptop, or palmtop computer system, or a personal digital assistant, cell phone, VoIP phone, traditional landline telephone (POTS phone), and/or other electronic device. Each of the Client Systems 13 and 40 may include or control a display device (i.e. Display Device 17 and Display Device 44 respectively) that is capable of displaying a graphical user interface (i.e. GUI 18 and GUI 46 respectively) to the local users 10 and 12 of those systems, such as a liquid crystal display (LCD), cathode ray tube (CRT), interferometric modulator display (IMOD), light emitting diode (LED), or the like. Additionally, each of the Client Systems 13 and 40 of FIG. 1 may include one or more audio and/or video input devices, such as a microphone and/or camera (e.g. a Webcam or other type of video capture device), for receiving audio and/or video data to be shared over a network among the participants in the real-time communication session.

Those skilled in the art will recognize that the Notification Delivery Client Logic 20 and 48 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 13 and 40 may each include one or more processors, and program storage, such as memory, for storing program code executable on such processors (e.g. Notification Delivery Client Logic 20 and 48, as well as Communication Application(s) Client Logic 21 and 49, and/or other application and/or operating system program code), and other input/output devices and/or other external interfaces in addition to the Audio Subsystems 15 and 42, Display Devices 17 and 44, and audio and/or video input devices.

Server system 22 may also be embodied as any specific type of computer system including one or more processors, and program storage, such as memory, for storing program code executable on such processors (e.g. Communication Application(s) Server Logic 23, Notification Delivery Server Logic 24, and/or other application and/or operating system program code), as well as for storing data and/or databases or the like such as Communication State Variable Identities for Associated Communication Channels 26, Communication State Variable Values 28, User Preferences 30, and/or Configuration Settings 32. Server system 22 may further include a number of input/output devices and/or other external interfaces. Those skilled in the art will further recognize that Notification Delivery Server Logic 24 may also be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware.

Communication State Variable Identities for Associated Communication Channels 26, Communication State Variable Values 28, User Preferences 30, and/or Configuration Settings 32 may be embodied using any specific type of database or the like, and may be accessible to and/or contained within the Communication Application(s) Server Logic 23 and/or Notification Delivery Server Logic 24. For example, Communication State Variable Identities for Associated Communication Channels 26 may be a database associating the names of relevant state variables with communication channels, so that the values of such relevant state variables can be checked to determine whether a candidate communication channel can be reliably used to deliver a recording notification to a given participant or participants. For example, Communication State Variable Identities for Associated Communication Channels 26 may associate an audio communication channel with a set of one or more communication state variables indicating whether an audio subsystem for a client device associated with a given participant is currently muted, and/or whether the call (VoIP or POTS) is currently on hold, and/or other relevant state variables whose values indicate whether the participant is currently able to hear an audio notification provided through the audio channel.

As a further example, Communication State Variable Identities for Associated Communication Channels 26 may associate a visual communication channel with a set of one or more communication state variables having values indicating whether a window object to be used to display a visual notification within the graphical user interface is currently visible.

Communication State Variable Identities for Associated Communication Channels 26 may further associate a visual or audio communication channel with one or more participant state variables whose values indicate whether a given participant is currently "present" at his or her computer system, and accordingly whether the participant is currently able to see a visual notification presented through a visual communication channel, or hear an audio notification presented through an audio communication channel.

Communication State Variable Values 28 may be a database of current values for specific communication state variables. Communication State Variable Values 28 may be periodically maintained or updated as needed, for example by Communication Application(s) Server Logic 23, Notification Delivery Server Logic 24, or other software executing on the Server System 22. For example, values for device state variables reflecting the current states of specific client systems may, for example, be obtained as needed by the Notification Delivery Server Logic 24 from Notification Delivery Client Logic 20 and/or 48.

Values for participant state variables reflecting online presence of specific participants may be obtained as needed by the Notification Delivery Server Logic 24 through an instant messaging service or application or the like.

User Preferences 30 includes indications of user preference settings relating to providing recording notifications. User Preferences 30 may be used to store preference settings obtained from various specific users and indicating, for example, whether a given user prefers to receive a certain type of notification (e.g. a recording notification) via a specific type of visual display (e.g. a pop-up window or the like), via a text message, or via a delayed audio message, in the event that a necessary recording or other notification cannot be delivered to the user via the audio channel at a particular time, such as the time a recording is started of a real-time communication session in which the user is a participant (e.g. because the disclosed system has determined that the audio subsystem on the user's client device is muted at that time).

Configuration Settings 32 include indications of administrator defined settings that may additionally or alternatively control how recording notifications are delivered by the disclosed system. Configuration Settings 32 may, for example, indicate how participants are to be provided with notifications (e.g. a recording notification) when a default communication channel (e.g. an audio channel) cannot reliably be used to deliver the notification (e.g. by using the audio channel after delaying notification delivery until the audio channel can be used reliably, by using a visual channel through which a visual notification is immediately presented to the participant at the beginning of the session, etc.).

The Communication Application(s) Server Logic 23 and Communication Application(s) Client Logic 21 and 49 may include and/or support any specific number and/or type of communication applications operable to support real-time communication sessions between Participant A 10 and Participant B 12. For example, Communication Application(s) Server Logic 23 and Communication Application(s) Client Logic 21 and 49 may include program code providing any specific type of VoIP application or protocol through which VoIP and/or POTS calls can be established between Participant A 10 and Participant B 12, and accordingly may include transmission technologies for delivery of voice communications over IP networks such as the Internet. In such an embodiment, real-time communication sessions between Participant A 10 and Participant B 12 may be telephone calls transported via the Internet (VoIP calls), and/or POTS calls transported via the public switched telephone network (PSTN).

For example, in an embodiment using VoIP service, the Communication Application(s) Server Logic 23 and Communication Application(s) Client Logic 21 and 49 operate to support an Internet telephone call between Participant A 10 and Participant B 12 by converting analog voice signals input from the participants into digital format, and compressing/translating such signals into Internet protocol (IP) packets for transmission between the participants over the Internet. In an embodiment in which POTS is used through the PSTN, the Communication Application(s) Server Logic 23 and Communication Application(s) Client Logic 21 and 49 operate to provide user control of POTS calls between Participant A 10 and Participant B 12 by, for example, enabling Participant A 10 and Participant B 12 to perform functions such as muting of a POTS call through their respective GUIs (18 and 46).

Communication Application(s) Server Logic 23 and Communication Application(s) Client Logic 21 and 49 may also include program code providing any specific type of Web conference or the like. Web conferencing provided by such an embodiment may accordingly include simultaneous audio and video conferencing among the conference participants via the Internet, in which both video and audio information are simultaneously shared in real-time among the conference participants. For example, Communication Application(s) Server Logic 23 and Communication Application(s) Client Logic 21 and 49 may operate to provide Web conferences including various specific types of live, online meetings, training, and/or presentations via a network such as the Internet, during which live or streaming video in which full motion Webcam, digital video camera and/or multi-media files are transmitted to the conference participants' client systems in real-time for display to the participants. Similarly, such Web conferences may include slide show presentations, in which slides (e.g. PowerPoint® or Keynote® slides) from a presenter participant are visually displayed by the participants' client systems, and the presenter may be provided markup tools and a remote mouse pointer to modify the display of the slides in real-time. IP audio may also be shared during such Web conferences, as well as a simultaneous text chat channel (e.g. instant messaging session) through which text messages can be shared among some or all of the conference participants during the conference. The visual data shared among Web conference participants may further support screen sharing/desktop sharing/application sharing, in which conference participants can view respectively anything a presenter currently has shown on his or her display screen, on his or her virtual desktop, or that is currently being displayed by an application executing on the presenter's computer.

In one embodiment, the notification provided to Web conference participants through the disclosed system indicates that one of the participants has a question or wishes to make a comment. Such a notification may, for example, be made up of an icon or other graphical object, such as a pop-up window. The visual notification in such an embodiment may include any specific visual depiction or message, such as a visual depiction of a hand waving or the like. The disclosed system may determine from the communication channel state that the display state of one or more client systems indicates that another window, such as a window providing a shared application to the conference participants, is currently obscuring the window to be used to provide the visual notification that a participant has a question or comment. In such a case, the disclosed system operates to select an alternative delivery option to using a candidate visual communication channel to deliver the notification. Such an alternative may, for example, include or consist of using an audio delivery channel to provide an audio notification (e.g. a sound or speech) indicating that a participant has a question or comment, or delaying delivery of the visual notification until the window to be used to deliver the visual notification is no longer obscured.

Figure 3:
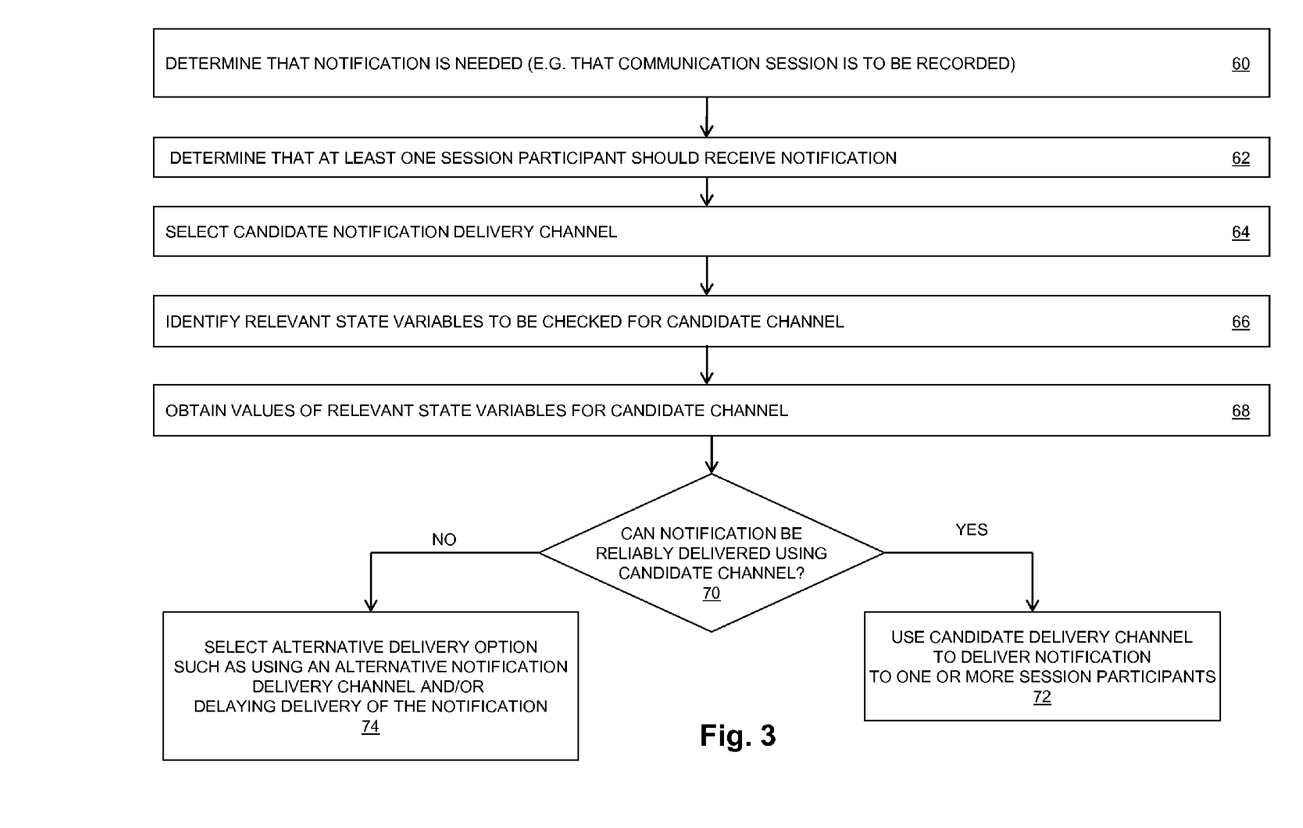
FIG. 3 is a flow chart showing steps performed during operation of an illustrative embodiment of the disclosed system.

FIG. 3 is a flow chart showing steps performed during operation of an illustrative embodiment of the disclosed system. The steps of FIG. 3 may, for example, be performed by the Communication Application(s) Server Logic 23, Notification Delivery Server Logic 24, Communication Application Client Logic 21 and 49, and/or Notification Delivery Client Logic 20 and 48.

At step 60, the disclosed system determines that an event has occurred requiring a notification. For example, at step 60, the disclosed system may determine that a real-time communication session is to be or is being recorded. For example, the disclosed system may operate to record all real-time communication sessions, a randomly selected subset of all calls, or specific real-time communication sessions that one or more participants expressly request to be recorded, e.g. by selecting a button, menu item or the like provided to the participants in a graphical user interface. Alternatively, the disclosed system may determine at step 60 that a session participant has selected (e.g. clicked on) a user interface object indicating that the participant has a question or comment they would like to make within the communication session. A need for any other specific type of notification may be determined at step 60, such as a different type of audio notification or a visual notification.

Responsive to a determination at step 60, at step 62 the disclosed system determines that one or more of the participants in the real time communication session should receive the notification. For example, in the case where at step 60 a determination was made that the real-time communication session is to be or is currently being recorded, at step 62 the disclosed system determines whether one or more participants in the communication session are to be provided with notifications informing them that the session is being recorded. For example, the determination at step 62 may be made responsive to configuration settings or the like indicating that participants in certain geographic locations (e.g. countries, states, or other legal jurisdictions), must be provided with recording notifications. When the disclosed system determines that a session participant is located in such a location, a determination is made at step 62 that the participant is to be provided a recording notification indicating that the session is being recorded.

At step 64, the disclosed system selects a candidate notification delivery channel for delivering the necessary notification. For example, a default notification delivery channel may initially be selected consisting of a shared audio channel over which a VoIP call or audio for a Web conference is being delivered to all participants, or some other shared communication channel, such as a visual communication channel providing notifications through a GUI window associated with the Web conference application and displayed on each client system. The selection at step 64 may be user specific, such that different channels are selected as candidate notification delivery channels for different participants in a given communication session, and where such different channels may accordingly be used to deliver recording notifications to different participants within the same communication session, for example based on individual user preference settings or the like.

At step 66, the disclosed system identifies the relevant communication state variables, including potentially both client device state variables and participant state variables, for the candidate notification delivery channel selected at step 64. For example, the determination at step 66 may be made in response to the contents of the Communication State Variable Identities for Associated Communication Channels 26 (FIG. 2) or the like. At step 68, the disclosed system obtains current values for the set of communication state variables determined at step 66, for example responsive to the Communication State Variable Values 28 (FIG. 2) or the like.

Responsive to the current values determined at step 68, at step 70 the disclosed system determines whether the candidate notification delivery channel can reliably be used to deliver a recording notification. For example, in the case of a candidate notification delivery channel made up of an audio channel (e.g. VoIP session for a VoIP call or Web conference), communication state variable values indicating that a participant's audio subsystem is currently muted, or that the candidate notification delivery channel is currently on hold, the disclosed system determines at step 70 that the candidate notification delivery channel cannot currently be used to reliably deliver the recording notification. Alternatively, in the case of a candidate notification delivery channel made up of a visual channel, the disclosed system may determine that a GUI window associated with the visual communication channel is currently obscured by another GUI window.

In such a case, step 70 is followed by step 74, in which the disclosed system selects an alternative delivery option. For example, selecting an alternative delivery option at step 74 might consist of or include checking whether an audio notification (e.g. a recording notification) could reliably be delivered using a different communication channel (e.g. a visual communication channel). Alternatively, the selection performed at step 74 might consist of or include checking whether a visual notification (e.g. a notification indicating that a session participant has a question or comment they would like to add to or within the session) could reliably be delivered using an audio communication channel (e.g. as a sound or speech). Such checking may, for example, include performing steps 66, 68 and 70 for the other channel, to determine whether the notification could be reliably delivered on the other channel. A next communication channel to be checked may be selected at step 74 based on the communication channels currently available to the participant or participants to which the notification is to be sent, and/or responsive to user preferences and/or system configuration settings.

Alternatively, at step 74, the delivery of the recording notification may be delayed. For example, at step 74 the disclosed system may wait a predetermined period of time, and then retry step 70 to determine if the values of the relevant communication state variables have changed to indicate that the candidate notification delivery channel can be used to reliably deliver the recording notification. Such delayed re-checking may be repeated periodically until the values of the relevant communication state variables change to indicate that the candidate notification delivery channel can reliably be used (e.g. until the device state variable values change to indicate that the participant or participants' audio output is un-muted).

In another alternative configuration or embodiment, if the candidate notification delivery channel is an audio channel, at step 74 the disclosed system operates to automatically and immediately generate the recording notification through a visual communication channel, e.g. by generating a pop-up window or the like in the participants' user interfaces informing them that the recording is being recorded, and further identifying the communication session that is being recorded. For example, the visual notification may include session identification information such as the participant phone number or numbers through which the session is operating, or the subject, topic, name and/or moderator for a Web conference that is currently being recorded.

Similarly, if the candidate notification delivery channel is a visual channel, at step 74 the disclosed system operates to automatically and immediately generate an audio version of the notification through an audio communication channel, e.g. by generating one or more special tones or beeps, and/or by generating audio speech. The audio notification may include identification of the participant that has the question or comment (e.g. the participant's name), and other spoken text (e.g. "Bob has a question").

In the event that at step 70 it is determined that the values of the relevant communication state variables indicate that the notification can reliably be delivered using the candidate notification delivery channel, then step 70 is followed by step 72, in which the candidate delivery channel is used to delivery the notification to one or more session participants. For example, in the case where the candidate notification delivery channel is a voice channel, at step 72 an audio notification would be broadcast to one or more session participants. Such an audio notification may, for example, include words such as "For quality control purposes, this call is being recorded", "For quality control purposes, this Web conference is being recorded", or any other specific words notifying the participant or participants that the real-time communication session is being recorded.

After repeated failures to determine a reliable notification delivery channel, the disclosed system may provide a visual or audible warning or alert message to one or more session participants indicating that the recording notification could not be provided to one or more session participants identified in the message. Such an alert or message may, for example, be provided to a moderator of a Web conference or conference all, to a call initiator, or to all session participants.

Figure 4:
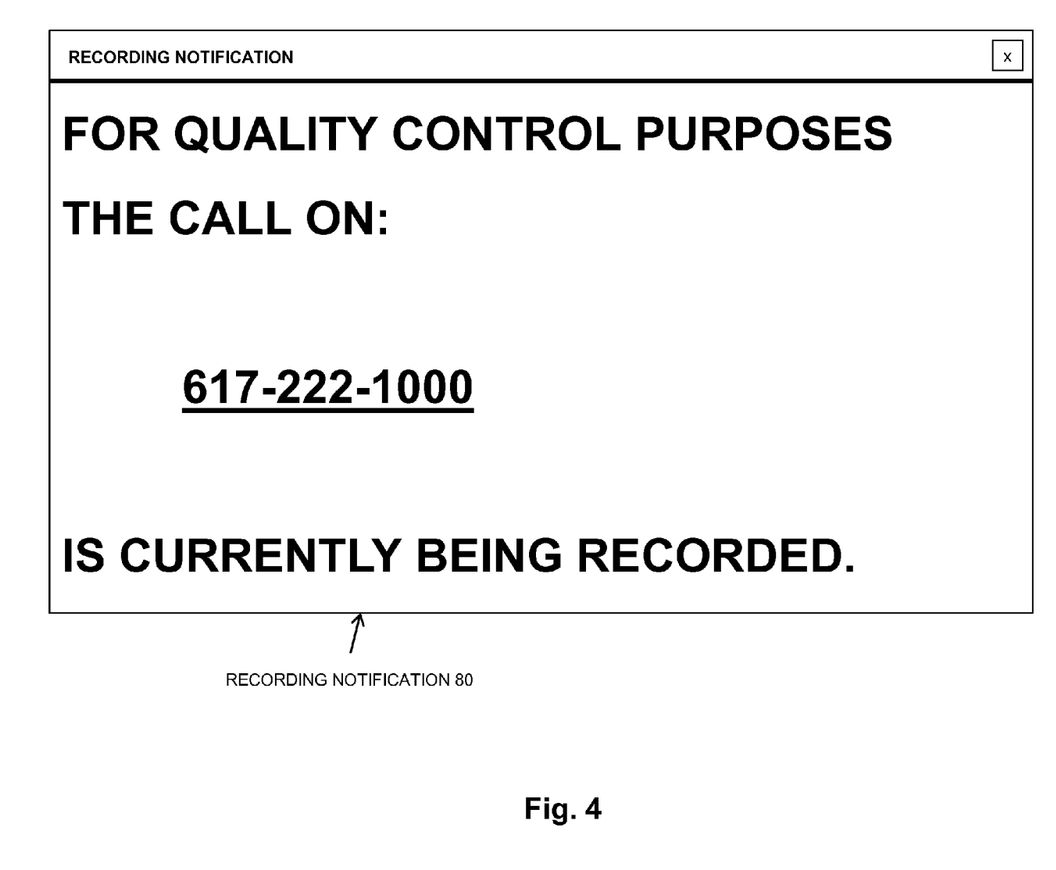
FIG. 4 is a first example of a visual recording notification generated by an illustrative embodiment of the disclosed system.

FIG. 4 is a first example of a visual recording notification generated by an illustrative embodiment of the disclosed system. As shown in FIG. 4, a visual recording notification 80 generated by the disclosed system is made up of pop-up window displayed within the participant's graphical user interface. The recording notification 80 includes text identifying the communication session being recorded, for example displaying a phone number over which the call being recorded was made or received, which accordingly may be the participant's local VoIP phone number or a remote caller's phone number. The recording notification further includes text informing the participant that the session is being recorded.

Figure 5:
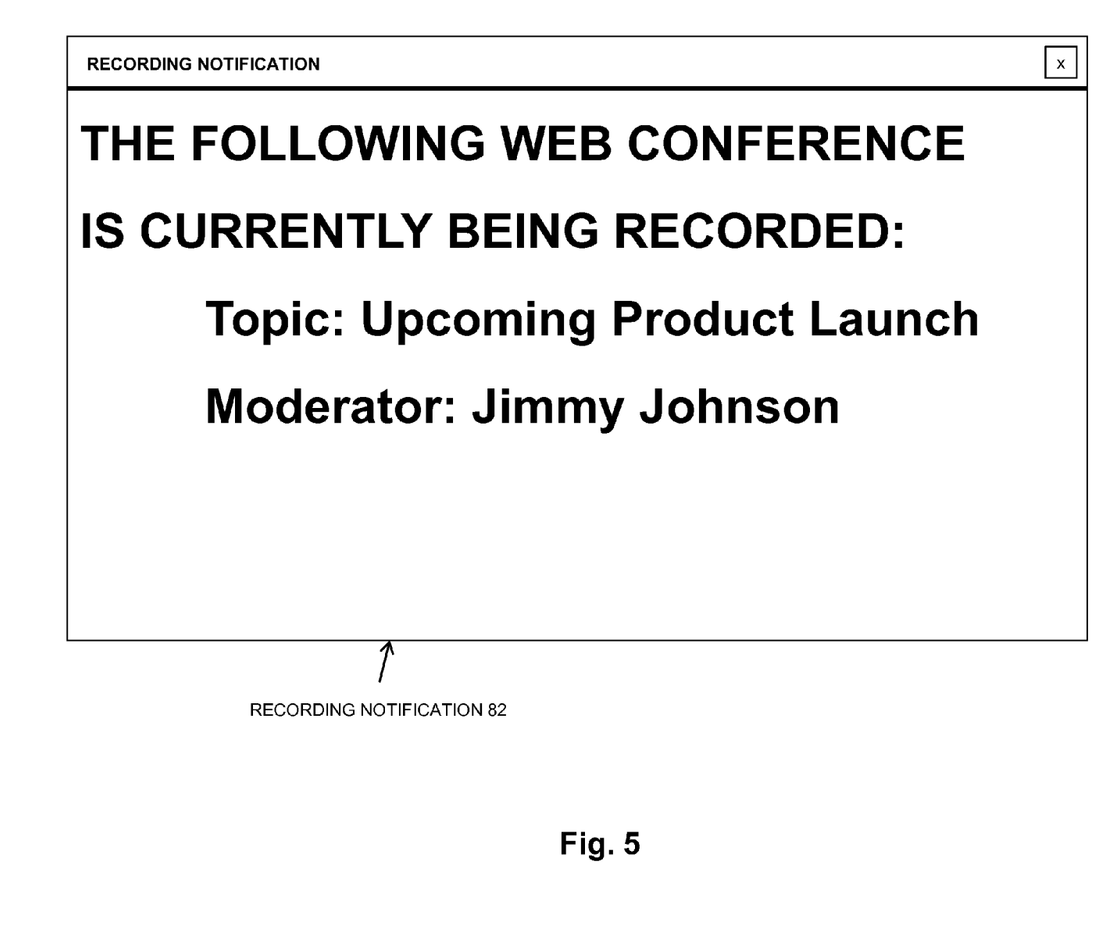
FIG. 5 is a second example of a visual recording notification generated by an illustrative embodiment of the disclosed system.

FIG. 5 is a second example of a visual recording notification generated by an illustrative embodiment of the disclosed system. As shown in FIG. 5, a visual recording notification 82 generated by the disclosed system is made up of pop-up window displayed within the participant's graphical user interface. The recording notification 82 includes text identifying the communication session being recorded, for example displaying a topic and the name of a moderator of a Web conference being recorded. The recording notification further includes text informing the participant that the session is being recorded.

Figure 6:
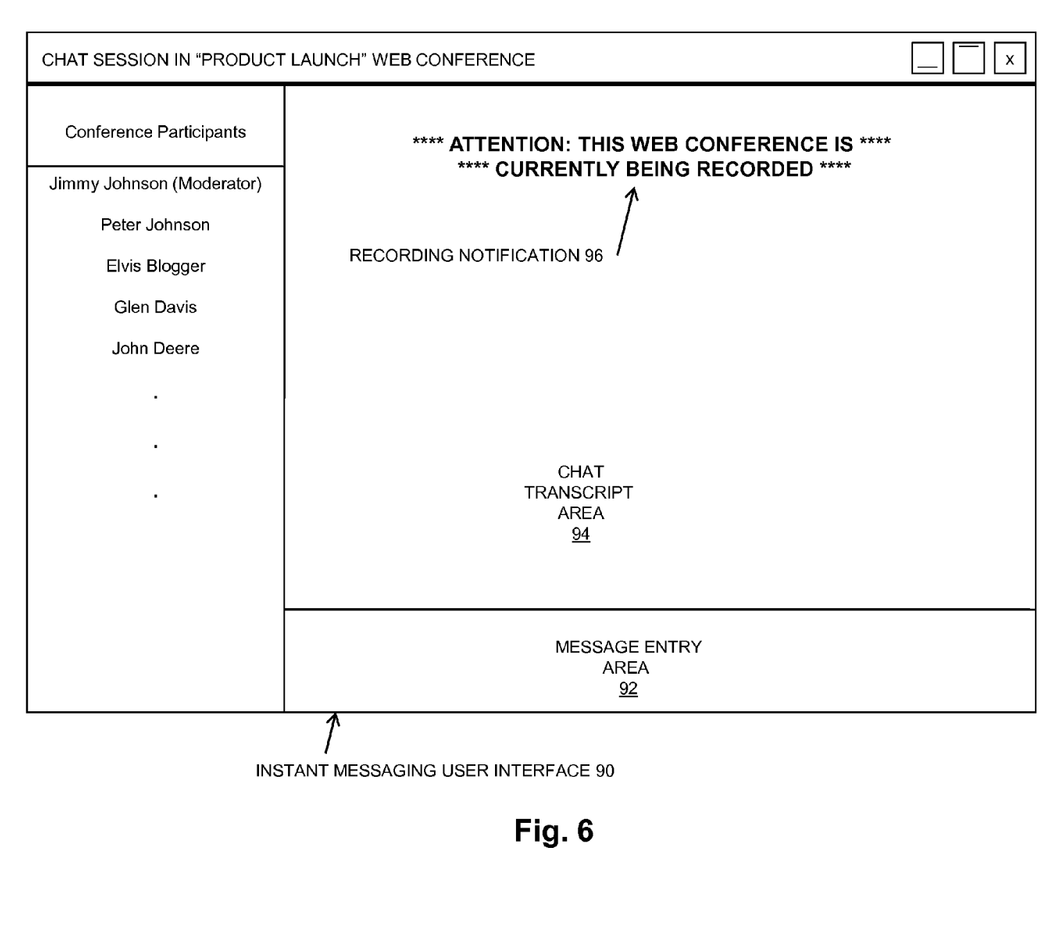
FIG. 6 shows a third example of a visual recording notification generated by an illustrative embodiment of the disclosed system.

FIG. 6 shows a third example of a visual recording notification generated by an illustrative embodiment of the disclosed system. As shown in FIG. 6, an Instant Messaging User Interface 90 provided as part of a Web Conference includes a Message Entry Area 92, and a Chat Transcript Area 94. A visual recording notification 96 generated by the disclosed system is made up of an instant message and/or other text prominently displayed within the Chat Transcript Area 94. The recording notification 96 includes text informing the participant that the Web Conference is being recorded. While the example of FIG. 6 shows an instant messaging user interface provided as part of a Web Conference, the disclosed system is not so limited. Accordingly, the visual recording notification 96 may alternatively be provided by an embodiment of the disclosed system to a participant in a communication session that does not include an instant messaging component, such as, for example, a VoIP phone call. In such an embodiment, the disclosed system may initiate an instant messaging session with the participant(s) in order to provide the visual recording notification 96 to the participants. In such a case, the visual recording notification may include text identifying the phone call or Web conference currently being recorded, such as one or more phone numbers involved in the call, a name of the moderator or a topic of the Web conference, and/or other session identification information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer implemented method of indicating to at least one user whether an audio communication channel is being recorded, comprising:

determining, responsive to a current value of at least one communication state variable, whether said audio communication channel can currently be reliably used to indicate to said user whether said audio communication channel is being recorded, said current value of said at least one communication state variable indicating whether an audio output on a client system associated with said user is currently muted; and selecting, responsive to a determination that said audio communication channel cannot currently be reliably used to indicate to said user whether said audio communication channel is being recorded because said audio output on said client system associated with said user is currently muted, an alternative delivery option for indicating to said user whether said audio communication channel is being recorded, wherein said alternative delivery option comprises a window generated in a display device on said client system associated with said user, and wherein said window visually indicates whether said audio communication channel is being recorded.

2. The method of claim 1, further comprising:
determining that said audio communication channel is to be recorded; and
wherein said determining whether said audio communication channel can currently be reliably used to indicate to said user whether said audio communication channel is being recorded is responsive to said determining that said audio communication channel is to be recorded.

3. The method of claim 1, further comprising:
determining that indicating whether said audio communication channel is being recorded is required; and
wherein said determining whether said audio communication channel can currently be reliably used to indicate to said user whether said audio communication channel is being recorded is responsive to said determining that indicating whether said audio communication channel is being recorded is required.

4. A computer implemented method of indicating to at least one user whether an audio communication channel is being recorded, comprising:

determining, responsive to a current value of at least one communication state variable, whether said audio communication channel can currently be reliably used to indicate to said end user whether said audio communication channel is being recorded, said current value of said at least one communication state variable indicating whether said audio communication channel is currently on hold; and selecting, responsive to a determination that said audio communication channel cannot currently be reliably used to indicate to said user whether said audio communication channel is being recorded because said audio communication channel is currently on hold, an alternative delivery option for indicating to said user whether said audio communication channel is being recorded, wherein said alternative delivery option comprises a window generated in a display device on said client system associated with said user, and wherein said window visually indicates whether said audio communication channel is being recorded.

5. The method of claim 1, further comprising:
wherein said window visually indicates that recording of said audio communication channel has been paused.

6. The method of claim 1, further comprising:
wherein said window visually indicates that recording of said audio communication channel has been stopped.

7. The method of claim 1, wherein said audio communication channel comprises a voice over IP (VoIP) communication session.

8. The method of claim 1, wherein said window comprises a pop-up window.

9. The method of claim 1, wherein said window visually indicates that said audio communication channel is being recorded.

10. The method of claim 4, wherein said audio communication channel comprises a voice over IP (VoIP) communication session.

11. The method of claim 4, wherein said window comprises a pop-up window.

12. The method of claim 4, wherein said window visually indicates that said audio communication channel is being recorded.

13. The method of claim 4, further comprising:
wherein said window visually indicates that recording of said audio communication channel has been paused.

14. The method of claim 4, further comprising:
wherein said window visually indicates that recording of said audio communication channel has been stopped.

* * * * *